(12) United States Patent
Nagae

(10) Patent No.: US 6,798,472 B2
(45) Date of Patent: Sep. 28, 2004

(54) LIGHT MODULATING DEVICE WHEREIN COLORED/UNCOLORED STATE OF COLOR FILTER IS ELECTRICALLY CONTROLLED BY SECOND ELECTRODE AND THIRD ELECTRODE

(75) Inventor: Nobukazu Nagae, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 10 days.

(21) Appl. No.: 10/388,406

(22) Filed: Mar. 17, 2003

(65) Prior Publication Data

US 2003/0184692 A1 Oct. 2, 2003

(30) Foreign Application Priority Data

Mar. 26, 2002 (JP) ........................................ 2002-086072

(51) Int. Cl.[7] .......................................... G02F 1/1335
(52) U.S. Cl. .................................................... 349/106
(58) Field of Search ........................... 349/106; 345/22, 345/72

(56) References Cited

U.S. PATENT DOCUMENTS 4,772,885 A * 9/1988 Uehara et al. ................ 349/71
4,935,757 A * 6/1990 Hatano et al. ............... 349/148
6,552,765 B2 * 4/2003 Kurata ........................ 349/113

FOREIGN PATENT DOCUMENTS

| JP | 9-244057 | 9/1997 |
| JP | 2000-284315 | 10/2000 |

* cited by examiner

Primary Examiner—Tarifur R. Chowdhury
(74) Attorney, Agent, or Firm—Nixon & Vanderhye, P.C.

(57) ABSTRACT

A light modulating device includes: a first substrate on which a first electrode layer and a light amount control layer are deposited in this order; a second substrate on which a second electrode layer and a color filter layer are deposited in this order, the second substrate opposing the first substrate; and a third electrode layer interposed between the light amount control layer and the color filter layer, wherein a plurality of picture elements are defined in a matrix pattern by the first electrode layer and the third electrode layer. An amount of light transmitted through the light amount control layer is electrically controlled by the first electrode layer and the third electrode layer. A colored/uncolored state of the color filter layer is electrically controlled by the second electrode layer and the third electrode layer.

13 Claims, 6 Drawing Sheets

LIGHT MODULATING DEVICE WHEREIN COLORED/UNCOLORED STATE OF COLOR FILTER IS ELECTRICALLY CONTROLLED BY SECOND ELECTRODE AND THIRD ELECTRODE

BACKGROUND OF THE INVENTION

1. Field of the Invention

The present invention relates to a light modulating device, and more particularly to a light modulating device capable of producing a color display and a high-resolution monochrome display. The light modulating device of the present invention may be used in a transmission type liquid crystal display device, a reflection type liquid crystal display device, a transmission/reflection type liquid crystal display device, an organic or inorganic EL (electroluminescence) device, an electrophoretic device, and an image reading device.

2. Description of the Background Art

Liquid crystal displays (LCDs) have been used in various applications, primarily in personal applications, for their advantageous features such as a small installation space and a small power consumption. It is expected that LCDs will be used in a wider range of applications and under more various circumstances. An LCD is provided with a color filter for producing a color display. In such a case, each pixel includes three picture elements of the three primary colors of light, i.e., R (red), G (Green) and B (Blue). The combination of the R, G and B picture elements and the ability to produce various gray levels in each picture element make it possible to produce a multi-color display.

It is said that the required resolution is 80 dpi (dots per inch) or more for image information, and 170 dpi or more for photographic images. However, for high-resolution image information such as character information and X-ray images, the required resolution is as high as 200 dpi or more. A color liquid crystal panel, which renders a single color (white or black) by driving three (R, G and B) picture elements, requires a resolution that is three times as high as that of a monochrome liquid crystal panel, which does not require a color filter, in the horizontal direction of the screen.

Therefore, a color liquid crystal panel having a resolution of substantially 600 dpi or more is required for displaying contents with which it is necessary to display a large number of characters clearly, such as novels and newspapers, for example. In order to realize a resolution of 600 dpi or more, individual pixels of a color liquid crystal panel need to be very small. However, it is very difficult to produce a color liquid crystal panel having a resolution of 600 dpi or more with production apparatuses that are commonly used in the art. In addition, as to the driving circuit, it is difficult to set appropriate driving conditions with such a high resolution. With small-size LCDs, it is possible to realize high-resolution LCDs by using techniques such as a time sequential method. With large-size LCDs, however, the substrate is also large, whereby the realization of large-size high-resolution LCDs is hindered by problems such as a delay in the voltage application at locations remote from the signal-input side.

In view of this, liquid crystal display devices have been developed in which the color/monochrome switching is enabled by controlling the color of the liquid crystal panel. For example, Japanese Laid-Open Patent Publication No. 2000-284315 discloses a method for enabling the color/monochrome switching by providing a polymer-dispersed liquid crystal layer between a color filter and a liquid crystal layer, so that light, which has passed through the color filter, passes through the polymer-dispersed liquid crystal layer, where the light is transmitted/scattered. Moreover, Japanese Laid-pen Patent Publication No. 9-244057 discloses another method for enabling the color/monochrome switching by layering an ECB (Electrically Controlled Birefringence) liquid crystal panel on a monochrome liquid crystal panel to utilize the coloring of light based on the birefringence effect of the ECB panel.

However, with the liquid crystal display device disclosed in Japanese Laid-Open Patent Publication No. 2000-284315, the light scattering effect is dependent on the thickness of the polymer-dispersed liquid crystal layer, and the thickness of the polymer-dispersed liquid crystal layer needs to be quite large to obtain a scattering effect that is strong enough to convert RGB light into white light, thereby requiring a very large voltage to be applied.

With the liquid crystal display device disclosed in Japanese Laid-Open Patent Publication No. 9-244057, the color purity is low because a color is produced by using an ECB panel. Moreover, since the transmittance cannot be controlled to an intended value, it is highly likely that an intended hue is not obtained in a color display. Furthermore, since two panels are layered together, a color shift may occur across the displayed image in a color display, and the display may appear in an incongruent manner because of a transmittance shift across a picture element in a monochrome display, due to the parallax between the monochrome liquid crystal panel and the ECB liquid crystal panel.

SUMMARY OF THE INVENTION

The present invention has been made in view of these problems in the art, and has an object to provide a light modulating device capable of producing a full-color display and a high-resolution monochrome display.

A light modulating device of the present invention includes: a first substrate on which a first electrode layer and a light amount control layer are deposited in this order; a second substrate on which a second electrode layer and a color filter layer are deposited in this order, the second substrate opposing the first substrate; and a third electrode layer interposed between the light amount control layer and the color filter layer, wherein: a plurality of picture elements are defined in a matrix pattern by the first electrode layer and the third electrode layer; an amount of light transmitted through the light amount control layer is electrically controlled by the first electrode layer and the third electrode layer; and a colored/uncolored state of the color filter layer is electrically controlled by the second electrode layer and the third electrode layer.

It is preferred that the color filter layer is solid or semisolid. The color filter layer may be made of a medium containing an organic electrochromic pigment, or may be a polymer-dispersed liquid crystal layer containing a dichroic pigment.

The color filter layers of the same hue may be arranged in a column direction, and the second electrode layer may be a plurality of stripe-shaped electrode layers, each of which is superposed on the color filter layers of the same hue. The plurality of stripe-shaped electrode layers may be connected to one or more signal lines.

The third electrode layer may be a plurality of picture element electrodes formed in a matrix pattern and each connected to a switching device; and the first electrode layer may be a common electrode layer opposing the plurality of picture element electrodes.

The second electrode layer may be a plurality of color filter electrode layers formed in regions superposed on the plurality of picture element electrodes, respectively; and a signal may be written to each of the plurality of color filter electrode layers via the switching device that is connected to the picture element electrode superposed on the color filter electrode layer. Alternatively, the second electrode layer may be a plurality of color filter electrode layers formed in regions superposed on the plurality of picture element electrodes, respectively; and a signal may be written to each of the plurality of color filter electrode layers via another switching device adjacent to the switching device that is connected to the picture element electrode superposed on the color filter electrode layer.

The plurality of picture element electrodes may be connected to a plurality of source signal lines extending in parallel to one another; and the plurality of color filter electrode layers may be connected to color filter signal lines extending in parallel to one another, the number of the color filter signal lines being equal to the number of the source signal lines.

The first electrode layer may be a plurality of picture element electrodes formed in a matrix pattern and each connected to a switching device; and the third electrode layer may be a common electrode layer opposing the plurality of picture element electrodes.

The light amount control layer may be a liquid crystal layer or an electroluminescence layer.

The term "picture element" is used herein to refer to the minimum unit whose optical state can be controlled to produce a display. In a color display, typically, the R, G and B minimum display units are referred to as "R picture element", "G picture element" and "B picture element", respectively. A set of an R picture element, a G picture element and a B picture element together form a "pixel". In a passive matrix display device, a "picture element" is defined as a region where one of column electrodes which are arranged in a stripe pattern crosses one of row electrodes which are perpendicular to the column electrodes. In an active matrix display device, a picture element region is defined by a picture element electrode and a common electrode (counter electrode) which opposes the picture element electrode. In an arrangement with a black matrix, strictly speaking, a "picture element" is a portion of each region across which a voltage is applied according to the intended display state which corresponds to an opening of the black matrix.

A plurality of picture elements are typically arranged in a matrix pattern. Thus, a plurality of picture elements are arranged in the row direction and in the column direction perpendicular to the row direction. Note however that the picture element arrangement is not limited to this, as long as they are arranged in two or more different directions. For example, in a color display device employing a delta arrangement, the column direction may be a slant direction with respect to the row direction. Note that the terms "column direction" and "row direction" are used herein merely to represent one direction in the display screen and another direction that crosses the first direction, and do not necessarily correspond to the length and width directions in the display screen.

DETAILED DESCRIPTION OF THE PREFERRED EMBODIMENTS

A light modulating device of the present invention includes a first substrate on which a first electrode layer and a light amount control layer are deposited in this order, a second substrate on which a second electrode layer and a color filter layer are deposited in this order, and a third electrode layer interposed between the light amount control layer and the color filter layer. The light amount control layer, the color filter layer and the first to third electrode layers will now be described.

Light Amount Control Layer

The light amount control layer used in the present invention is a layer capable of controlling the amount of light to be emitted by the light modulating device itself or the amount of external light to be transmitted through the light modulating device, based on the potential difference between the first electrode layer and the third electrode layer, or the current flowing between the first electrode layer and the third electrode layer, Specifically, the light amount control layer may be a liquid crystal layer, a white organic or inorganic EL layer, an electrophoretic layer, or the like. The light amount control layer may be driven by either a passive driving method or an active driving method.

Color Filter Layer

The color filter layer used in the present invention reversibly changes its colored/uncolored state based on the potential difference between the second electrode layer and the third electrode layer, or the current flowing between the second electrode layer and the third electrode layer. For example, the color filter layer may be a polymer electrochromic material whose color can be reversibly changed by applying an electric field. A typical material may be a conductive polymer that can be reversibly switched between the red state and the colorless state [e.g., poly(o-trimethylsilylphenylacetylene)].

Figure 8A:
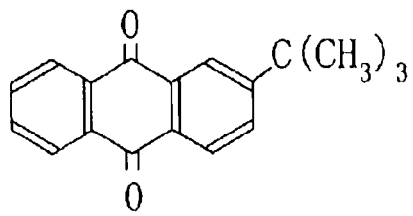
FIG. 8A and FIG. 8B are structural formulae each illustrating an example of an electrochromic material (red).
Figure 8B:
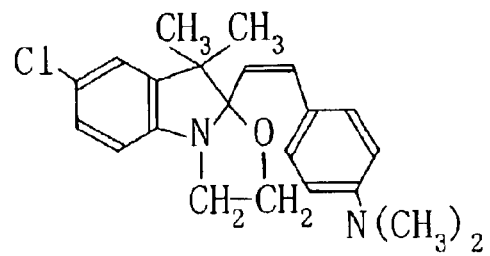

Alternatively, an organic electrochromic pigment that reversibly changes its colored/uncolored state through an oxidation-reduction reaction may be used. For example, organic electrochromic pigments for a red color include an anthraquinone pigment (FIG. 8A) and a styryl-type spiropyran pigment (FIG. 8B), organic electrochromic pigments for a green color include a aromatic amine pigment (FIG.

Figure 9A:
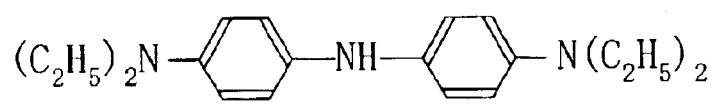
FIG. 9A and FIG. 9B are structural formulae each illustrating an example of an electrochromic material (green).
Figure 9B:
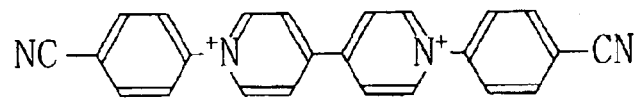
Figure 10A:
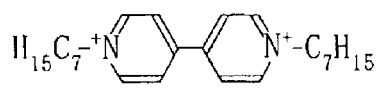
FIG. 10A and FIG. 10B are structural formulae each illustrating an example of an electrochromic material (blue).
Figure 10B:
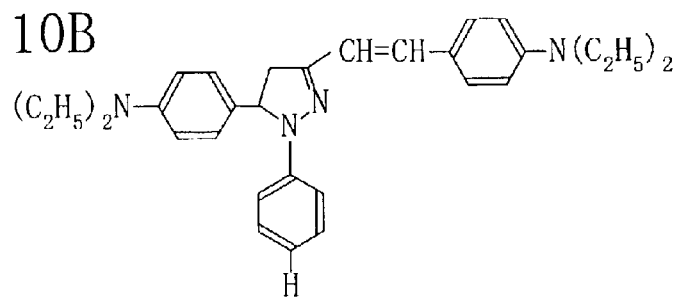

9A) and a viologen pigment (FIG. 9B), and organic electrochromic pigments for a blue color include a viologen pigment (FIG. 10A) and a pyrazoline pigment (FIG. 10B). An organic electrochromic pigment may be introduced to a side chain of, or dispersed in, not only a conjugated conductive polymer, but also one of various insulative polymers (such as vinyl polymers, amino polymers, and siloxane polymers). An organic electrochromic pigment and a solid electrolyte, e.g., a polymer solid electrolyte, may be used to produce an all-solid electrochromic device. Alternatively, these low-molecular-weight organic electrochromic pigments may be dissolved in a solid electrolyte film. Thus, a color filter layer may be made of a medium (such as a polymer or a solid electrolyte) containing an organic electrochromic pigment.

Figure 11A:
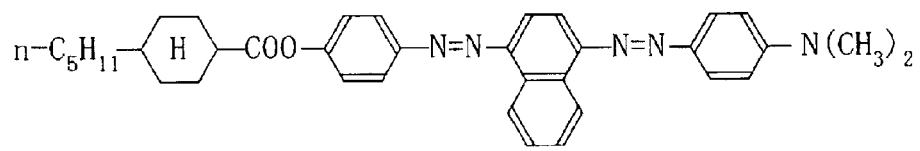
FIG. 11A to FIG. 11C are structural formulae each illustrating an example of a dichroic pigment.
Figure 11B:
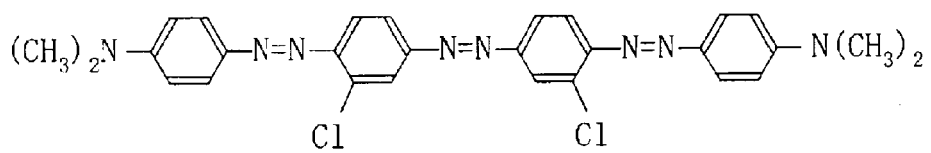
Figure 11C:
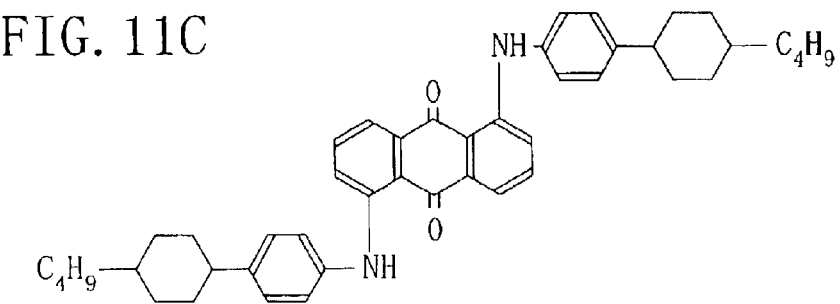

A color filter layer used in the present invention may be a polymer-dispersed liquid crystal layer (PDLC) containing a dichroic pigment. A dichroic pigment is a pigment that absorbs visible light anisotropically, i.e., with the visible light absorption along the long axis of the molecule differing from that along the short axis of the molecule. A PDLC containing a dichroic pigment is a polymer matrix obtained by dispersing, in a polymer, a microcapsule encapsulating therein a mixture of a liquid crystal material and a dichroic pigment. In the absence of an applied voltage, liquid crystal molecules are oriented in various directions in the microcapsule, and thus the incident light is absorbed, whereby the PDLC appears to be colored. However, in the presence of an applied electric field, the liquid crystal molecules are oriented parallel to the electric field, and thus the incident light is not absorbed, whereby the PDLC appears to be uncolored (colorless). A dichroic pigment is preferably a pigment with rich hue that has a dichroism ratio and a high molar absorption coefficient, and may be, for example, a diazo pigment (FIG. 11A), a trisazo pigment (FIG. 11B), or an anthraquinone pigment (FIG. 11C).

The color filter layer may be a liquid filled into a cell. However, in order to increase the handling property thereof and to facilitate the production process, the color filter layer is preferably solid or semisolid so that it can maintain its shape without leaking through the gap between the second electrode layer and the third electrode layer.

The color filter layer may be driven by either a passive driving method or an active driving method, as is the case with the light amount control layer. For the color filter layer, it is only required that the display color is constant, and thus it is not necessary to take into consideration the response speed of the liquid crystal molecules in response to a voltage change, for example. With a passive driving method, the structure is simple and can be produced at a low cost. With an active matrix driving method, on the other hand, the display mode can be switched between the high-resolution monochrome display and the color display in any intended region.

The color filter layer does not have to be driven uniformly across the entire display area, but may alternatively be driven only in a part of the display area. For example, the color filter layer may be driven so that a color/monochrome display is enabled in the right half of the display area, while only a color display is produced in the left half of the display area. The color filter layer may employ any of various suitable arrangements such as a stripe arrangement, a mosaic arrangement, a delta arrangement, and a square arrangement.

First To Third Electrode Layers

In the light modulating device of the present invention, the light amount control layer is interposed between the first electrode layer and the third electrode layer, and the color filter layer is interposed between the second electrode layer and the third electrode layer. In other words, the third electrode layer is interposed between the light amount control layer and the color filter layer, and is used for driving the light amount control layer and the color filter layer.

The first electrode layer, the second electrode layer and the third electrode layer may each be stripe-shaped electrodes extending in parallel to one another, a single-piece electrode (common electrode), and a picture element electrode whose shape and size correspond to those of a picture element. When the light amount control layer or the color filter layer is driven by an active driving method, at least one of the first electrode layer, the second electrode layer and the third electrode layer is connected to an active element such as a TFT (Thin Film Transistor). Typically, a plurality of picture element electrodes arranged in a matrix pattern are each connected to the drain terminal of the TFT. The source terminals of the TFTs are connected to a plurality of video (source) signal lines extending in parallel to one another in the column direction, and the gate terminals of the TFTs are connected to a plurality of scanning (gate) signal lines extending in parallel to one another in the row direction.

When the light amount control layer and the color filter layer are driven both by an active driving method, a light amount control layer TFT and a color filter layer control TFT may be provided for driving/controlling these layers, respectively. Alternatively, the light amount control layer and the color filter layer may be driven by a single TFT.

The color filter layer may be driven/controlled for each picture element, or for each column. For example, when the color filter layers of the same hue are arranged in the column direction, the second electrode layer may be a plurality of stripe-shaped electrodes, each of which is superposed on the color filter layers of the same hue.

The plurality of stripe-shaped electrode layers may be connected to one or more signal lines. For example, when the color filter layers of each column can be driven by the same driving voltage, one signal line may be connected to the stripe-shaped electrode layer of each column. When the color filter layers of different hues are driven with different driving voltages, the same number of signal lines as the number of hues are connected to the stripe-shaped electrode layers superposed on the color filter layers of the respective hues. For example, when the R, G and B color filter layers are driven with different voltages for the different hues, three signal lines corresponding to R, G and B are connected to the stripe-shaped electrode layers superposed on the R, G and B color filter layers, respectively.

The light modulating device of the present invention has no substrate interposed between the light amount control layer and the color filter layer, whereby the distance between the first or second electrode layer and the third electrode layer is reduced as compared with that in a case where a substrate is interposed therebetween. Therefore, with the light modulating device of the present invention the applied voltage can be reduced as compared with that in a case where a substrate is interposed. Moreover, since no substrate is interposed between the light amount control layer and the color filter layer, and thus these layers are adjacent to each other, the color shift across the displayed color image and the incongruent appearance in a monochrome display, which occur due to the parallax between these layers, are reduced.

Embodiment 1

Figure 1:
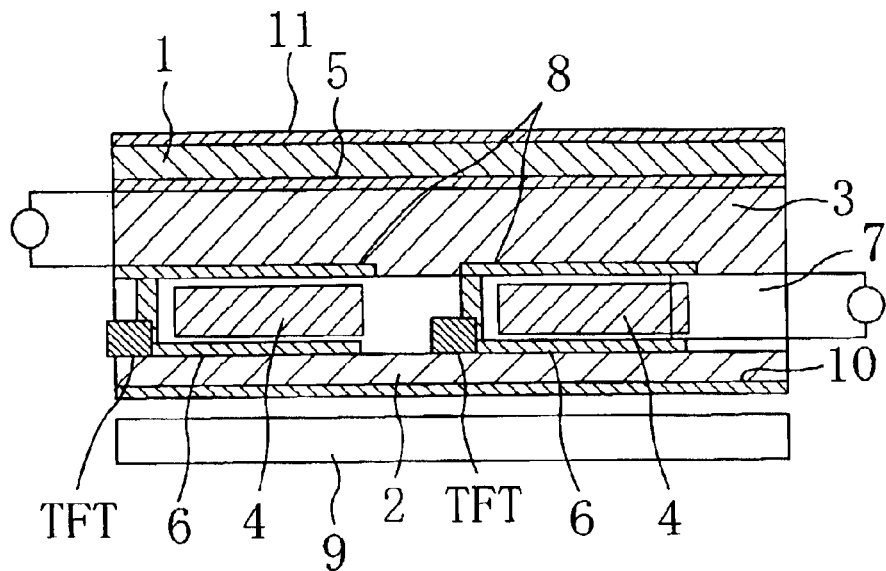
FIG. 1 is a cross-sectional view schematically illustrating a light modulating device of Embodiment 1.

FIG. 1 is a cross-sectional view schematically illustrating a light modulating device of Embodiment 1. The light modulating device of the present embodiment includes a first substrate 1 and a second substrate 2 (each of which is a glass substrate, a plastic substrate, or the like), a liquid crystal layer 3 for changing the optical transmittance, and color filter layers 4 of different hues (i.e., R, G and B), which are arranged in a matrix pattern. A common electrode layer 5 is provided entirely across one surface of the first substrate 1 that is closer to the liquid crystal layer 3. Color filter control electrode layers 6 and TFTs are arranged in a matrix pattern on one surface of the second substrate 2 that is closer to the color filter layers 4. An insulative layer 7 is formed between adjacent color filter layers 4, and a picture element electrode layer 8 is formed on the color filter layer 4 of each picture element. Each of the electrode layers 5, 6 and 8 is a transparent electrode layer such as an ITO film, for example. In the present embodiment, each region where the picture element electrode layer 8 and the common electrode layer 5 are superposed on each other defines a picture element.

A backlight unit 9 is provided on the outer side of the second substrate 2, and polarizers 10 and 11 are provided on the outer sides of the substrates 1 and 2, respectively. With the polarizers 10 and 11, it is possible to transmit only a portion of light coming from the backlight unit 9 that is oscillating in a certain angle in a plane perpendicular to the direction in which the light is traveling.

Figure 2:
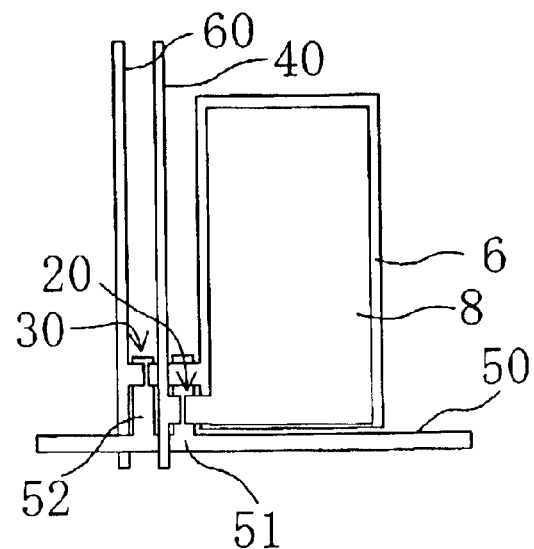
FIG. 2 is a plan view illustrating one picture element of the light modulating device of Embodiment 1.

FIG. 2 is a plan view illustrating one picture element of the light modulating device of the present embodiment. The picture element electrode layers 8 arranged in a matrix pattern are each connected to a picture element electrode TFT 20. A plurality of source signal lines 40 extending in parallel to one another in the column direction and a plurality of gate signal lines 50 extending in parallel to one another in the row direction so as to cross the source signal lines 40 are formed on the second substrate 2. The picture element electrode layers 8 are connected to the source signal lines 40, to which signal voltages are applied, via the TFTs 20, and each TFT 20 is switched by a scanning signal from the gate signal line 50. In other words, the TFTs 20 determine voltages to be applied to the picture element electrode layers 8 from the source signal lines 40 while the screen is scanned in the column direction by the gate signal lines 50. A signal voltage is applied to the picture element electrode layer 8 connected to the TFT 20 that is turned ON by the scanning signal, and the optical transmittance is adjusted by the liquid crystal layer 3 based on the potential difference between the picture element electrode layer 8 and the common electrode layer 5 opposing the picture element electrode layer 8.

The color filter control electrode layers 6 arranged in a matrix pattern are each connected to a color filter TFT 30, which is different from the picture element electrode TFT 20. The color filter TFT 30 is connected to the gate signal line 50, which is also connected to the picture element electrode TFT 20. Specifically, two parallel gate terminals 51 and 52 are extending in the column direction from the gate signal lines 50 and connected to the TFTs 20 and 30, respectively. The color filter TFT 30 is connected to a color filter signal line 60 extending in parallel to the source signal line 40, which is connected to the picture element electrode TFT 20. In the present embodiment, the number of the source signal lines 40 is equal to the number of the color filter signal lines 60.

The color filter layer 4 is interposed between the color filter control electrode layer 6 and the picture element electrode layer 8. Since the color filter layer 4 is made of an electrochromic layer, an oxidation-reduction reaction is caused by a current occurring due to the potential difference between the electrode layers 6 and 8, thereby changing the colored/uncolored state of the color filter layer 4. Thus, the colored/uncolored state of the color filter layer 4 is changed by adjusting the potential difference between the electrode layers 6 and 8.

In the light modulating device of the present embodiment, the optical transmittance is adjusted by the liquid crystal layer 3 based on the potential difference between the picture element electrode layer 8 and the common electrode layer 5, and the potential of the color filter control electrode layer 6 is adjusted based on the potential of the picture element electrode layer 8, thereby changing the colored/uncolored state of the color filter layer 4. In a color display, three picture elements corresponding to R, G and B together form one pixel. On the other hand, in a monochrome display, one picture element forms one pixel, thereby enabling a display with a resolution that is three times as high as that in a color display. Thus, with the light modulating device of the present embodiment, the switching between a high-resolution monochrome display and a color display is enabled.

Moreover, when the color filter layer 4 is uncolored, light is transmitted with a higher optical transmittance than when the color filter layer 4 is colored. Therefore, the brightness of white light passing through the uncolored color filter layers 4 is higher than that of white light obtained by synthesizing together light passing through the color filter layers, which are colored in R, G and B. With such bright light, the brightness of the backlight unit 9 can be reduced, thereby enabling a low-power operation.

In the light modulating device of the present embodiment, no substrate is interposed between the liquid crystal layer 3 and the color filter layer 4, whereby the distance between the common electrode layer 5 and the picture element electrode layer 8 or the distance between the color filter control electrode layer 6 and the picture element electrode layer 8 is reduced as compared with that in a case where a substrate is interposed therebetween. Therefore, with the light modulating device of the present embodiment, the applied voltage can be reduced as compared with that in a case where a substrate is interposed. Moreover, since no substrate is interposed between the liquid crystal layer 3 and the color filter layer 4, and thus these layers 3 and 4 are adjacent to each other, the color shift across the displayed color image and the incongruent appearance in a monochrome display, which occur due to the parallax between these layers 3 and 4, are reduced.

A method for producing the light modulating device of the present embodiment will now be described. Note that the TFTs 20 and 30, the gate signal lines 50, the color filter signal lines 60, the color filter control electrode layer 6 and the picture element electrode layer 8 can be produced by an ordinary photolithography method, and thus the production method for these elements will not be described below.

First, a mixture of an organic electrochromic material for each of R, G and B (see FIG. 8A, FIG. 9A, FIG. 10A) and tetrabutylammonium perchlorate as an electrolyte (weight ratio=1:1) is dissolved in a dimethylacetamide solvent to obtain an electrochromic solution. The electrochromic solution is applied on each color filter control electrode layer 6 provided on the second substrate 2 by an ink jet method. The obtained structure is baked at 170° C. for 30 minutes to form the color filter layer 4 in each picture element.

The upper surface of the second substrate 2, excluding the color filter layers 4, is covered with an insulative layer 7. Contact holes are formed in the insulative layer 7, through which connection is to be established to the source terminal and the drain terminal of each picture element electrode TFT 20. The picture element electrode layers 8 are formed on the color filter layers 4, and the source signal lines 40 is formed on the insulative layer 7. The picture element electrode layers 8 and the source signal lines 40 are formed by an ink jet method, using a transparent electrode layer of PEDOT [poly (3,4-ethylenedioxythiophene)]. At this time, each source signal line 40 and each picture element electrode layer 8 are connected to the source terminal and the drain terminal, respectively, of the picture element electrode TFT 20 via the contact holes.

An alignment film (not shown) is formed on each of the first substrate 1 and the second substrate 2, and the substrates 1 and 2 are attached to each other via a sealant (not shown). A liquid crystal material is injected into the gap between the substrates 1 and 2 to form the liquid crystal layer 3. The polarizers 10 and 11 are attached to the outer side of the substrates 1 and 2, respectively, and the backlight unit 9 is provided at a predetermined position.

Embodiment 2

Figure 3:
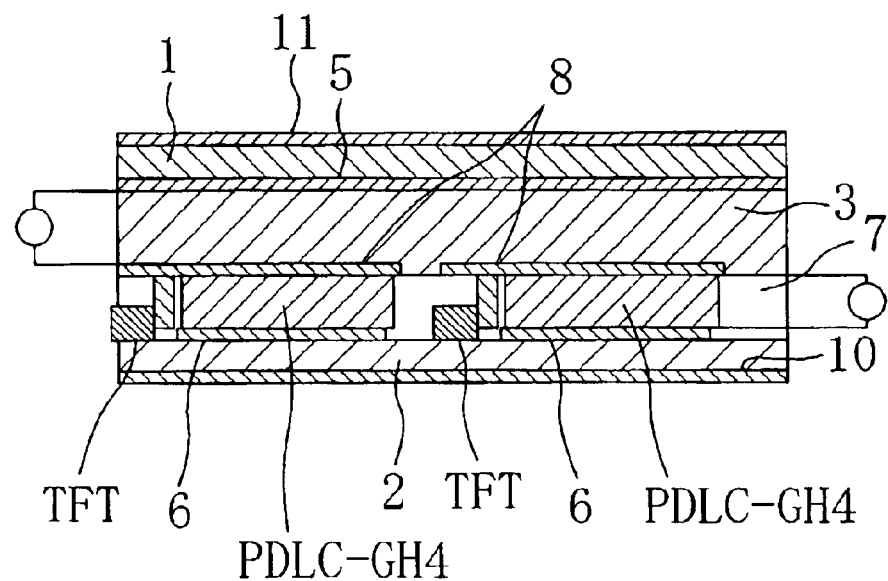
FIG. 3 is a cross-sectional view illustrating a light modulating device of Embodiment 2.

FIG. 3 is a cross-sectional view illustrating a light modulating device of Embodiment 2. The light modulating device of the present embodiment has a structure that is substantially the same as that of the light modulating device of Embodiment 1, and like elements to those of Embodiment 1 will be denoted by like reference numerals and will not be further described below. In the present embodiment, the color filter layer 4 is a microcapsule-encapsulated polymer-dispersed liquid crystal layer (PDLC-GH) (denoted as "PDLC-GH4" in FIG. 3), and is different from Embodiment 1 where the color filter layer 4 is made of an electrochromic layer in that a microcapsule-encapsulated polymer-dispersed liquid crystal layer containing a dichroic pigment of one of three hues, i.e., R, G and B, is provided for each picture element.

The PDLC-GH of the present embodiment can be prepared by the following method, for example. A trisazo pigment (FIG. 11B) as a cyan pigment, a diazo pigment (FIG. 11A) as a yellow pigment, and an anthraquinone pigment (FIG. 11C) as a magenta pigment are used. A mixture is prepared by mixing 30% by weight of a nematic liquid crystal material ZLI-4792 (manufactured by Merck & Co., Inc.), to which each of the above pigments is added at a weight ratio of 3:1 (liquid crystal material:pigment), with 70% by weight of an acrylic monomer, and with 2 to 3% by weight of a photoinitiator added thereto. The mixture is applied onto the color filter control electrode layers 6 provided on the second substrate 2, and irradiated with UV light (peak wavelength: 363 nm) to cure the film of the mixture, thereby forming the color filter layers 4 of the respective hues.

Figure 4:
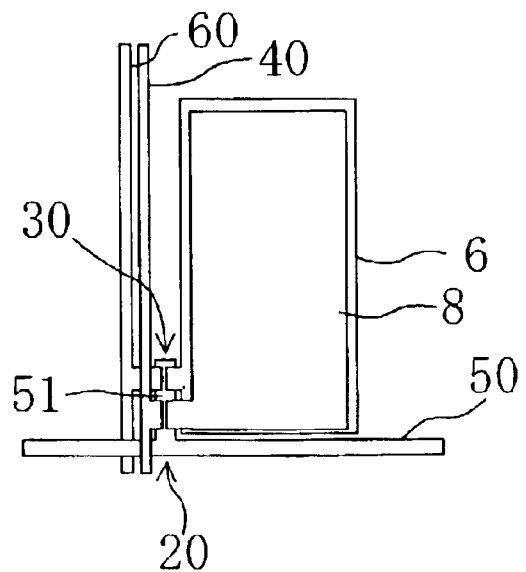
FIG. 4 is a plan view schematically illustrating the light modulating device of Embodiment 2.

FIG. 4 is a plan view schematically illustrating one picture element of the light modulating device of the present embodiment. In the present embodiment, the gate terminal 51 extending in the column direction from the gate signal line 50 is the only gate terminal for each picture element. Thus, the picture element electrode TFT 20 and the color filter TFT 30 are connected to the common gate terminal 51. With the gate terminal 51 being shared by the TFTs 20 and 30, the interval between two adjacent picture elements in the row direction is reduced, thereby increasing the aperture ratio, as compared with Embodiment 1 where the two gate terminals 51 and 52 are arranged in the row direction.

Note that as in Embodiment 1, the picture element electrode layers 8 and the source signal lines 40 are formed by an ink jet method using a transparent electrode layer of PEDOT, and are connected to the source terminals and the drain terminals, respectively, of the picture element electrode TFTs 20 via contact holes formed in the insulative layer 7.

In the present embodiment, as in Embodiment 1, the potential of the color filter control electrode layer 6 and the potential of the picture element electrode layer 8 are adjusted based on data (source signal) from the source signal line 40, while the screen is scanned in the column direction. Thus, the presence/absence of a predetermined applied voltage to the color filter layer 4 is determined.

Inside a droplet of a polymer-dispersed liquid crystal material, dichroic pigment molecules, which have some anisotropy with respect to the pigment absorption coefficient, are oriented in various directions in the absence of an applied voltage. Each dichroic pigment molecule absorbs/transmits polarized light of an intended wavelength. As a result, light of an intended wavelength is transmitted through each picture element, thereby producing a color display.

In the presence of an applied voltage, the liquid crystal molecules in the polymer matrix rise to be perpendicular to the electrode layer. Then, the long axis of the pigment molecules is also oriented in parallel to the direction in which light travels, whereby the pigment molecules do not absorb light. As a result, the transmitted light is not colored, thereby producing a black and white display. Therefore, also in the present embodiment, the switching between a high-resolution monochrome display and a color display is enabled by inputting a color filter driving signal and a liquid crystal display signal separately from panel terminals to the color filter control electrode layer 6 and the picture element electrode layer 8, respectively.

As in Embodiment 1, with the light modulating device of the present embodiment, the applied voltage can be reduced as compared with a case where a substrate is interposed. Moreover, since no substrate is interposed between the liquid crystal layer 3 and the color filter layer (PDLC-GH) 4, and thus these layers 3 and 4 are adjacent to each other, the color shift across the displayed color image and the incongruent appearance in a monochrome display, which occur due to the parallax between these layers 3 and 4, are reduced.

Embodiment 3

Figure 5:
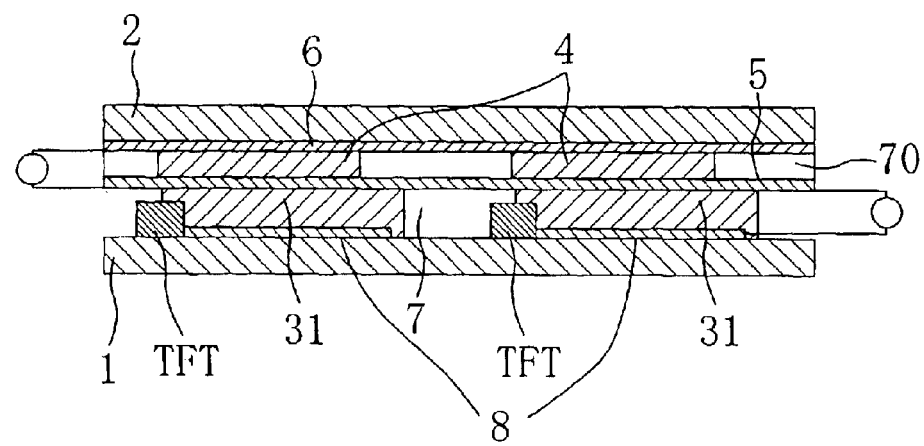
FIG. 5 is a cross-sectional view schematically illustrating a light modulating device of Embodiment 3.

FIG. 5 is a cross-sectional view schematically illustrating a light modulating device of Embodiment 3. In the light modulating device of the present embodiment, the color filter control electrode layers 6 and the color filter layers 4 are formed on the counter substrate (the second substrate 2). The color filter layer 4 is an organic electrochromic layer as in Embodiment 1, and the light amount control layer is a white EL layer 31. Since the white EL layer 31 is a self-luminous light amount control layer, a backlight is not required.

The white EL layer 31 is interposed between the picture element electrode layers 8 arranged in a matrix pattern on the first substrate 1, and the common electrode layer 5. Moreover, the color filter layers 4 are interposed between the stripe-shaped color filter control electrode layers 6 formed on the second substrate 2, and the common electrode layer 5. The color filter layers 4 of the same hue are arranged in the column direction, and the color filter control electrode layers 6 are arranged so that each color filter control electrode layer 6 is superposed on the color filter layers 4 of the same hue. Note that the color filter layers 4 may be continuous in the column direction, or may be separately formed for each picture element.

Figure 6:
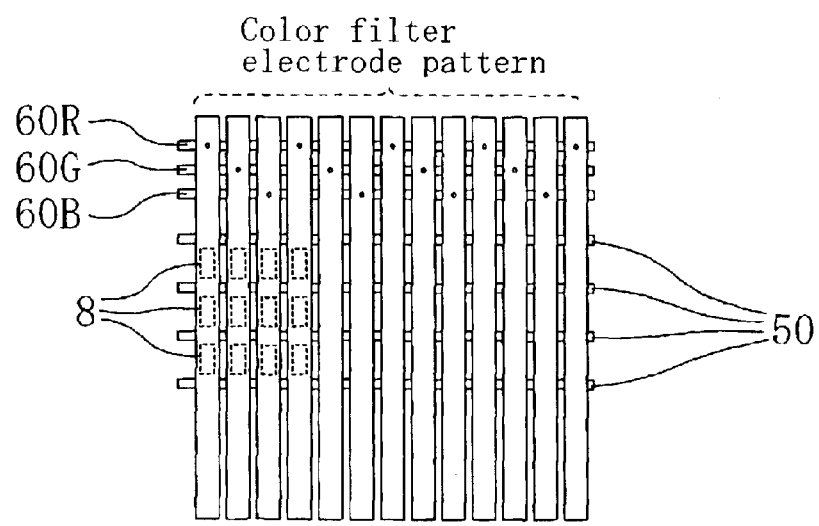
FIG. 6 is a plan view schematically illustrating the light modulating device of Embodiment 3.

FIG. 6 is a plan view schematically illustrating the light modulating device of the present embodiment. The color filter control electrode layers 6 are provided in the form of a plurality of stripes extending in the column direction, each of which is superposed on the color filter layers 4 of the same hue (hereinafter referred to also as "stripe-shaped electrode layers 6"). The stripe-shaped electrode layers 6 for the hues of R, G and B are connected respectively to R, G and B color filter signal lines 60R, 60G and 60B, extending in parallel to one another. Thus, the color filter control electrode layer 6 of each hue can receive a different signal according to the hue of the corresponding color filter layer 4. For example, if a predetermined potential signal is input to the red color filter signal line 60R, the signal is input to the color filter control electrode layer 6 of each column for red. In the presence of an applied voltage, the color filter layers 4 do not give the colors of R, G and B, whereby light from the white EL layer 31 is not colored, thereby producing a white display. Moreover, when no current is flowing through the white EL layer 31, the white EL layer 31 does not emit light, thereby producing a black display, irrespective of the presence/absence of an applied voltage to the color filter layer 4. Note that the colored/uncolored switching may be performed for the color filter layers 4 across the entire screen, or the colored/uncolored switching may be performed selectively for the color filter layers 4 in one or more of regions that are obtained by dividing the screen in the column direction.

A method for producing the light modulating device of the present embodiment will now be described. First, a plurality of picture element electrode layers 8 arranged in a matrix pattern, a plurality of TFTs for switching the plurality of picture element electrode layers 8, respectively, a plurality of source signal lines extending in parallel to one another in the column direction, each of the source signal lines along one column being connected to a plurality of TFTs along the same column, and a plurality of scanning signal lines extending in parallel to the row direction, each of the scanning signal lines along one row being connected to a plurality of TFTs along the same row, are formed on the first substrate 1 by a photolithography method. The white EL layers 31 are formed respectively on the picture element electrode layers 8 arranged in a matrix pattern. The region excluding the white EL layers 31 is covered with the insulative layer 7.

After an ITO film is formed across the entire surface of the second substrate 2, the ITO film is etched so as to leave portions thereof in the regions where the color filter layers 4 are formed, thereby forming the stripe-shaped color filter control electrode layers 6. Organic electrochromic layers are formed on the color filter control electrode layers 6 to provide the color filter layers 4 of different hues, in a similar manner to that in Embodiment 1. A black resist is applied so as to fill the gap between adjacent color filter layers 4, and irradiated with UV light to form a black matrix 70. The length of time for the UV light irradiation is adjusted so that the thickness of the black resist is about the same as that of the color filter layers. The common electrode layer 5 is formed across the entire surface of the color filter layers 4 and the black matrix 70. The first substrate 1 and the second substrate 2 are attached to each other, thereby obtaining the light modulating device of the present embodiment.

In the light modulating device of the present embodiment, the brightness of the white EL layer 31 is controlled by a current produced by the potential difference between the picture element electrode layer 8 and the common electrode layer 5. Moreover, the potential of the color filter control electrode layer 6 is adjusted based on the potential of the common electrode layer 5 so as to change the colored/uncolored state of the color filter layer 4. Therefore, the switching between a high-resolution monochrome display and a color display is enabled by inputting a color filter driving signal and a signal for causing the white EL layer 31 to emit light separately from panel terminals to the color filter control electrode layer 6 and the picture element electrode layer 8, respectively. Particularly, by forming the color filter control electrode layer 6 selectively in one or more regions of the entire screen, the display screen area can be divided into a color display region, and a region where the switching between a high-resolution monochrome display and a color display is enabled.

As in Embodiment 1, with the light modulating device of the present embodiment, the applied voltage can be reduced as compared with a case where a substrate is interposed. Moreover, since no substrate is interposed between the white EL layer 31 and the color filter layer 4 made of an organic electrochromic layer, and thus these layers 31 and 4 are adjacent to each other, the color shift across the displayed color image and the incongruent appearance in a monochrome display, which occur due to the parallax between these layers 31 and 4, are reduced.

Alternative Embodiments

While a case where the light amount control layer is driven by an active matrix driving method has been described in Embodiments 1 to 3, the light amount control layer may alternatively be driven by a passive matrix driving method. Moreover, transmission type light modulating devices have been described in Embodiments 1 to 3, the present invention may alternatively be used with a reflection type light modulating device, which can be obtained by forming the color filter control electrode layers 6 from a reflective film made of aluminum, for example. Furthermore, the present invention may alternatively be used with a reflection/transmission type light modulating device in which openings are formed in the reflective film. While TFTs are used as active elements in Embodiments 1 to 3, two-terminal devices such as MIM (Metal Insulator Metal) devices, or other three-terminal devices such as FETs may alternatively be used.

The light modulating device of the present invention may be used as a reading device for reading characters or images on an object such as a newspaper, a magazine, etc. For example, a reading device can be produced by providing a photodiode for each light amount control layer TFT of the light modulating device of Embodiment 1, and covering the photodiodes with color filter layers of different hues. While the color filter layer side of the reading device is facing the object, the object is illuminated with light from the side of the reading device that is away from the object, so that the reflected light is received by the photodiode of each picture element. Only a portion of the reflected light that has the hue of each color filter layer is transmitted through the color filter layer to be received by the photodiode. Information of light received by a photodiode is written to the corresponding picture element by the light amount control layer TFT corresponding to the photodiode, whereby picture element information is stored in each picture element. The picture element information stored in each picture element can be displayed by using a backlight, for example, thereby copying the object. Also in the reading device, switching between two reading modes, i.e., a high-resolution monochrome image mode and a color image mode, is enabled by performing the color/monochrome switching of the color filter layers.

Comparative Example

Figure 7:
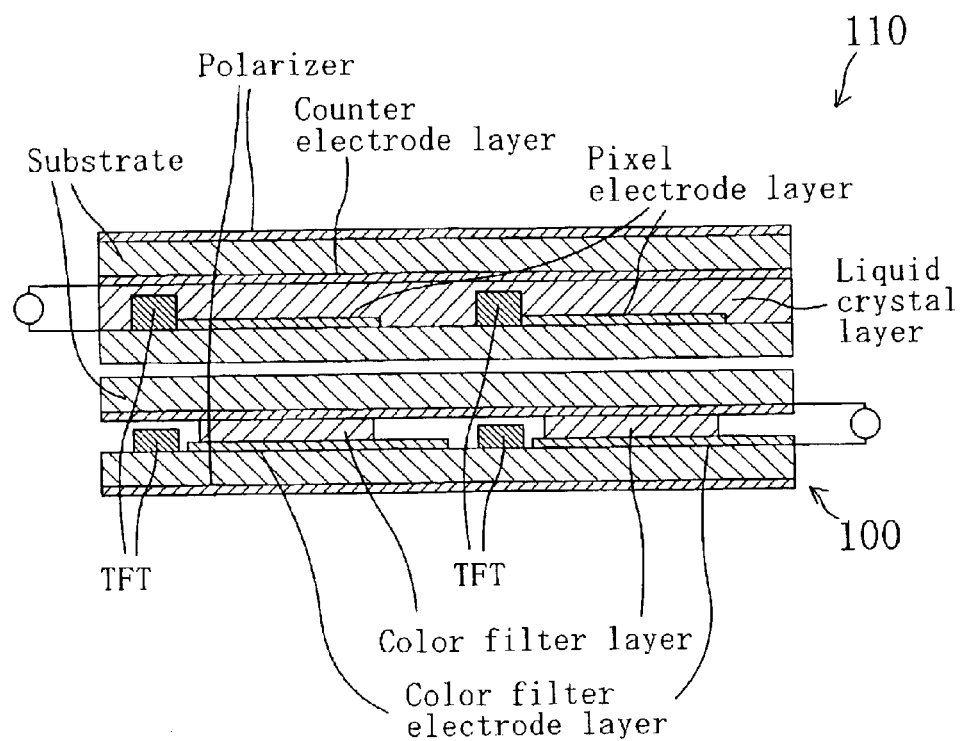
FIG. 7 is a cross-sectional view schematically illustrating a light modulating device of a comparative example.

FIG. 7 is a cross-sectional view schematically illustrating a light modulating device of a comparative example, shown in comparison with the light modulating device of the present invention. The light modulating device of the comparative example includes two panels, i.e., a color filter panel 100 and a liquid crystal panel 110. A color filter layer whose colored/uncolored state is electrically controlled is formed on the color filter panel 100. In other words, the color filter layer and the liquid crystal layer are each interposed between a pair of substrates and a pair of electrode layers.

When an image is displayed on the screen while some of the color filter layers are uncolored by being switched by the color filter panel 100, the high-resolution monochrome/color divided display can be observed from a direction normal to the screen. However, when the light modulating device of the comparative example is observed from a slightly-inclined viewing angle, a color shift occurs across the displayed image in a color display, and the display appears in an incongruent manner because of a transmittance shift across a picture element in a monochrome display, due to the parallax-between the color filter panel 100 and the liquid crystal panel 110.

With the light modulating device of the present invention, a full-color display and a high-resolution monochrome display are both realized, while reducing the color shift across the displayed image and the incongruent appearance in a monochrome display.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A light modulating device, comprising:
    a first substrate on which a first electrode layer and a light amount control layer are deposited in this order;
    a second substrate on which a second electrode layer and a color filter layer are deposited in this order, the second substrate opposing the first substrate; and
    a third electrode layer interposed between the light amount control layer and the color filter layer, wherein:
    a plurality of picture elements are defined in a matrix pattern by the first electrode layer and the third electrode layer;
    an amount of light transmitted through the light amount control layer is electrically controlled by the first electrode layer and the third electrode layer; and
    a colored/uncolored state of the color filter layer is electrically controlled by the second electrode layer and the third electrode layer.

2. The light modulating device of claim 1, wherein the color filter layer is solid or semisolid.

3. The light modulating device of claim 1, wherein the color filter layer is made of a medium containing an organic electrochromic pigment.

4. The light modulating device of claim 1, wherein the color filter layer is a polymer-dispersed liquid crystal layer containing a dichroic pigment.

5. The light modulating device of claim 1, wherein the color filter layers of the same hue are arranged in a column direction, and the second electrode layer is a plurality of stripe-shaped electrode layers, each of which is superposed on the color filter layers of the same hue.

6. The light modulating device of claim 5, wherein the plurality of stripe-shaped electrode layers are connected to one or more signal lines.

7. The light modulating device of claim 1, wherein:
    the third electrode layer is a plurality of picture element electrodes formed in a matrix pattern and each connected to a switching device; and
    the first electrode layer is a common electrode layer opposing the plurality of picture element electrodes.

8. The light modulating device of claim 7, wherein:
    the second electrode layer is a plurality of color filter electrode layers formed in regions superposed on the plurality of picture element electrodes, respectively; and
    a signal is written to each of the plurality of color filter electrode layers via the switching device that is connected to the picture element electrode superposed on the color filter electrode layer.

9. The light modulating device of claim 8, wherein:
    the plurality of picture element electrodes are connected to a plurality of source signal lines extending in parallel to one another; and
    the plurality of color filter electrode layers are connected to color filter signal lines extending in parallel to one another, the number of the color filter signal lines being equal to the number of the source signal lines.

10. The light modulating device of claim 7, wherein:
    the second electrode layer is a plurality of color filter electrode layers formed in regions superposed on the plurality of picture element electrodes, respectively; and
    a signal is written to each of the plurality of color filter electrode layers via another switching device different from the switching device that is connected to the picture element electrode superposed on the color filter electrode layer.

11. The light modulating device of claim 10, wherein:
    the plurality of picture element electrodes are connected to a plurality of source signal lines extending in parallel to one another; and
    the plurality of color filter electrode layers are connected to color filter signal lines extending in parallel to one another, the number of the color filter signal lines being equal to the number of the source signal lines.

12. The light modulating device of claim 1, wherein:
    the first electrode layer is a plurality of picture element electrodes formed in a matrix pattern and each connected to a switching device; and
    the third electrode layer is a common electrode layer opposing the plurality of picture element electrodes.

13. The light modulating device of claim 1, wherein the light amount control layer is a liquid crystal layer or an electroluminescence layer.

* * * * *